United States Patent [19]

Boudouris et al.

[11] 4,010,910
[45] Mar. 8, 1977

[54] FILM SUPPLY AND TAKE-UP SYSTEM FOR MOTION PICTURE PROJECTOR

[75] Inventors: Angelo Boudouris, Sylvania; William D. Petty, Perrysburg; Clarence S. Simonds, Sylvania, all of Ohio

[73] Assignee: Eprad Incorporated, Toledo, Ohio

[22] Filed: Sept. 29, 1975

[21] Appl. No.: 617,520

[52] U.S. Cl. .............................. 242/55.18; 352/128
[51] Int. Cl.² .................. B65H 17/48; G03B 21/00
[58] Field of Search ................. 242/55.18, 55.19 R, 242/55.19 A, 75.51, 55.19; 352/128, 126

[56] References Cited

UNITED STATES PATENTS

| | | | |
|---|---|---|---|
| 2,094,922 | 10/1937 | John | 242/55.18 |
| 2,443,248 | 6/1948 | Hurley | 242/55.18 X |
| 2,706,629 | 4/1955 | Cailliot | 242/55.19 |
| 3,045,937 | 7/1962 | Johnson | 242/75.51 |
| 3,780,959 | 12/1973 | Burth | 242/55.18 |
| 3,823,890 | 7/1974 | Potts | 242/55.18 |

FOREIGN PATENTS OR APPLICATIONS

| | | | |
|---|---|---|---|
| 1,237,893 | 10/1967 | Germany | 242/55.19 R |
| 344,350 | 2/1931 | United Kingdom | 242/55.19 R |

*Primary Examiner*—Billy S. Taylor
*Attorney, Agent, or Firm*—Oliver E. Todd, Jr.

[57] ABSTRACT

An improved film supply and take-up transport for use with a motion picture projector. At least two horizontal film platters are connected through bearing plates to a single vertical drive shaft. A circular film winding core is selectively positioned concentric with the shaft on one platter. The core engages a mechanism for locking the platter through the bearing plate to the drive shaft for operating the platter in a take-up mode. A motor is controlled to rotate the drive shaft for winding the film onto the core at the same rate that the film is advanced through the projector. Film is supplied to the projector from the center of a film coil on another platter which is coupled through its bearing plate to the drive shaft. A brake is intermittently operated to slow the supply platter below the speed of the drive shaft to maintain a desired film supply rate.

13 Claims, 9 Drawing Figures

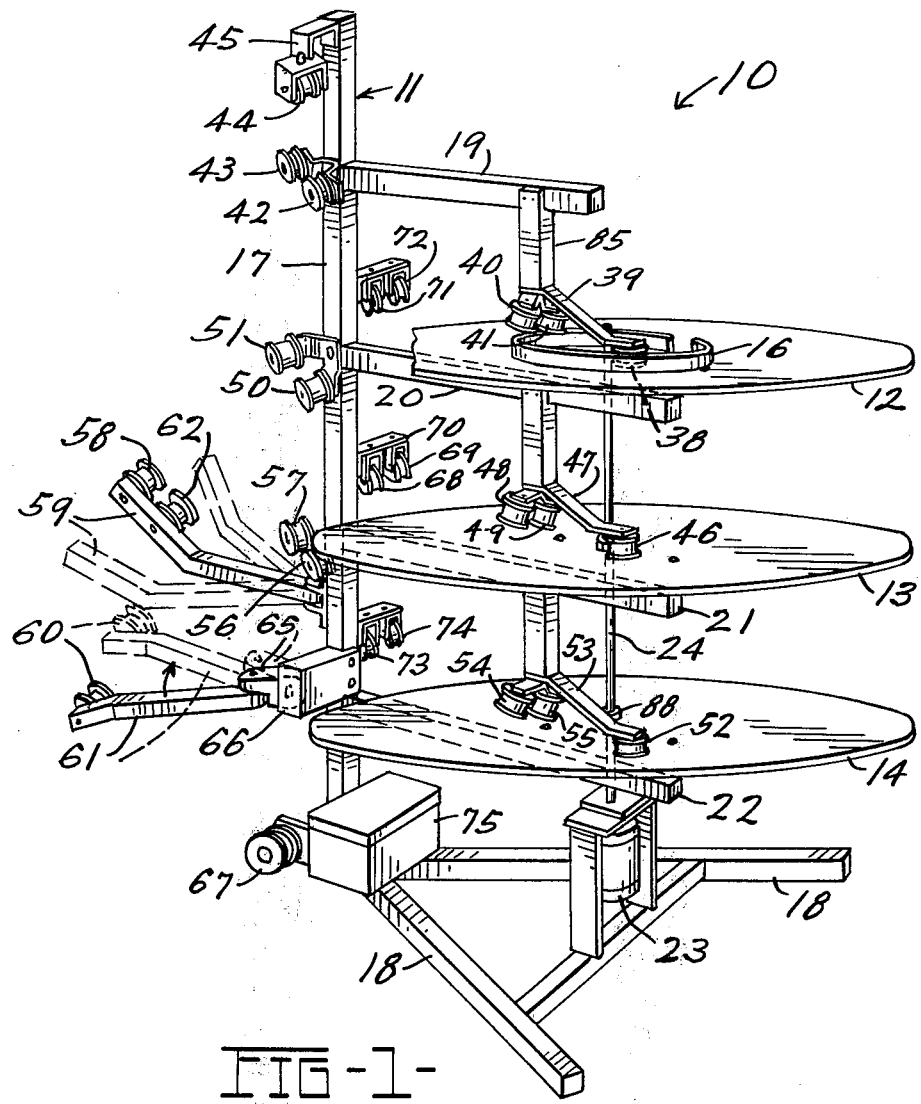
FIG-1-

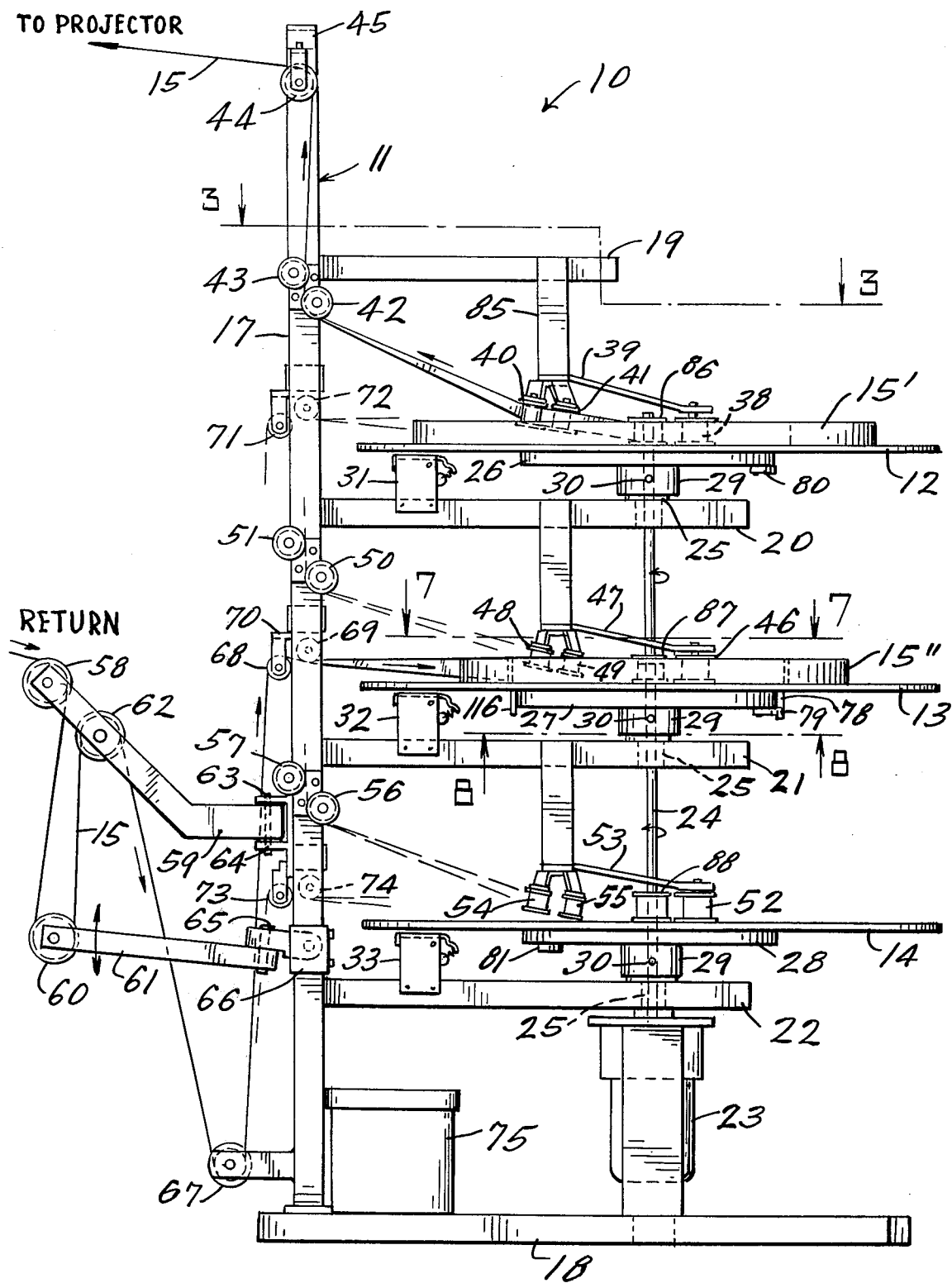
FIG-2-

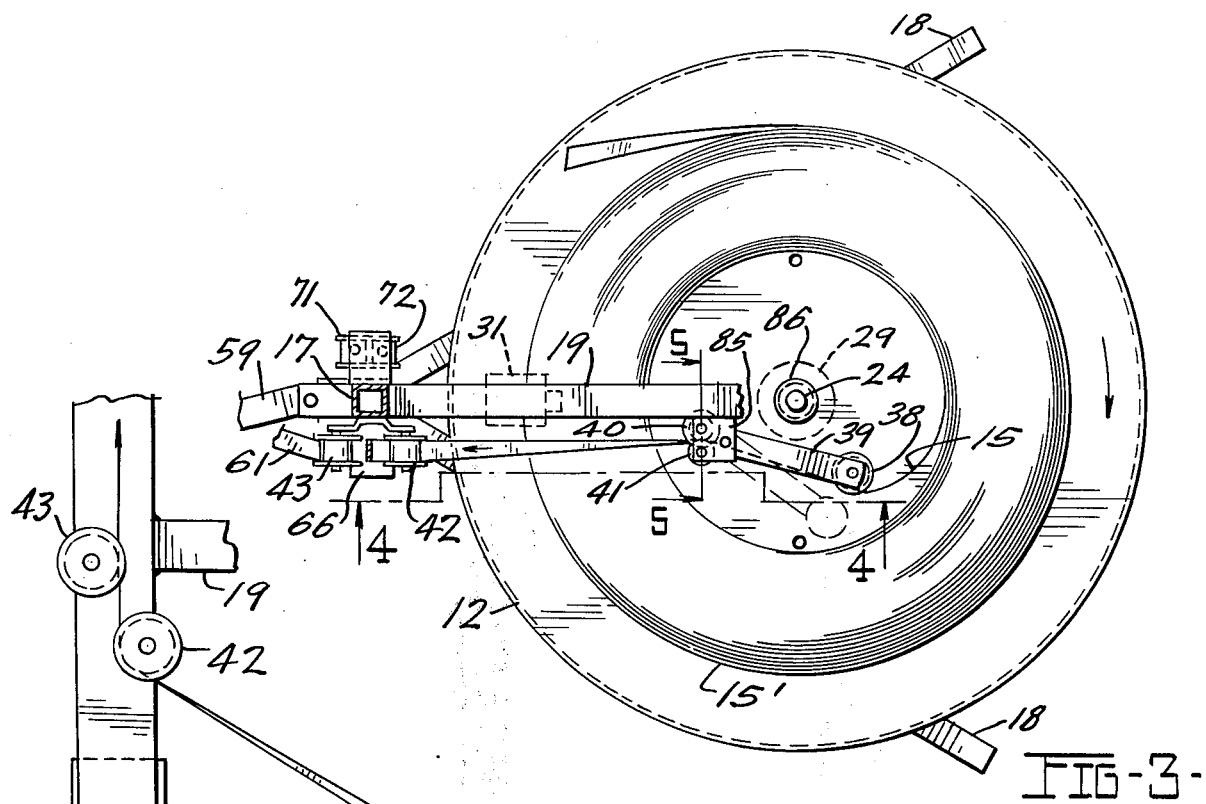
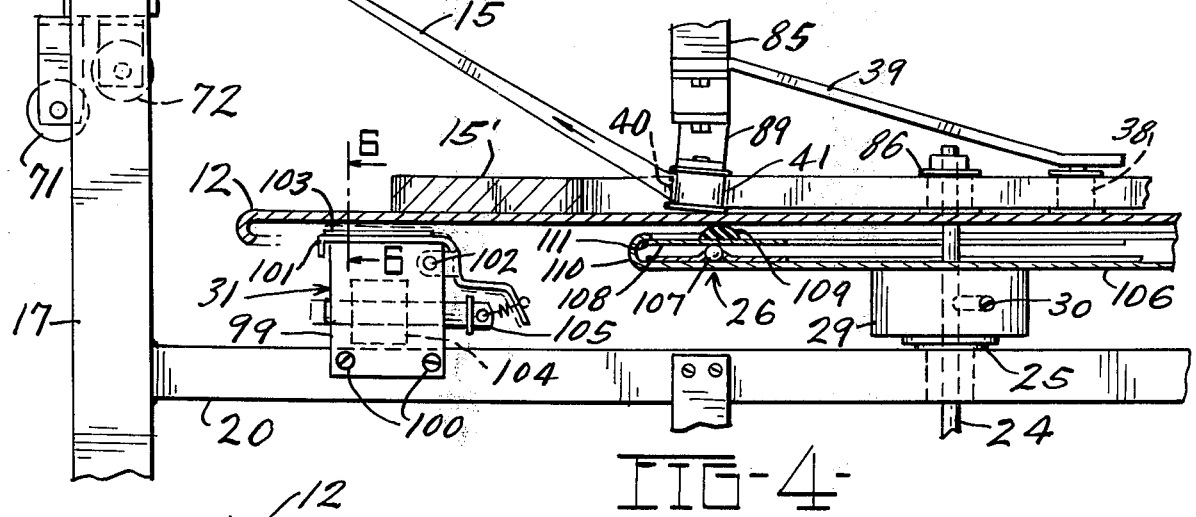
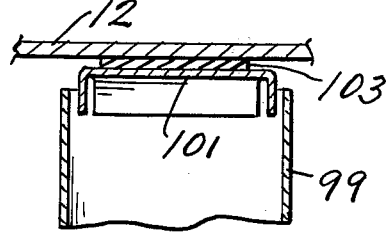
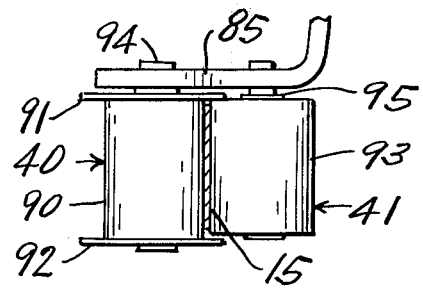

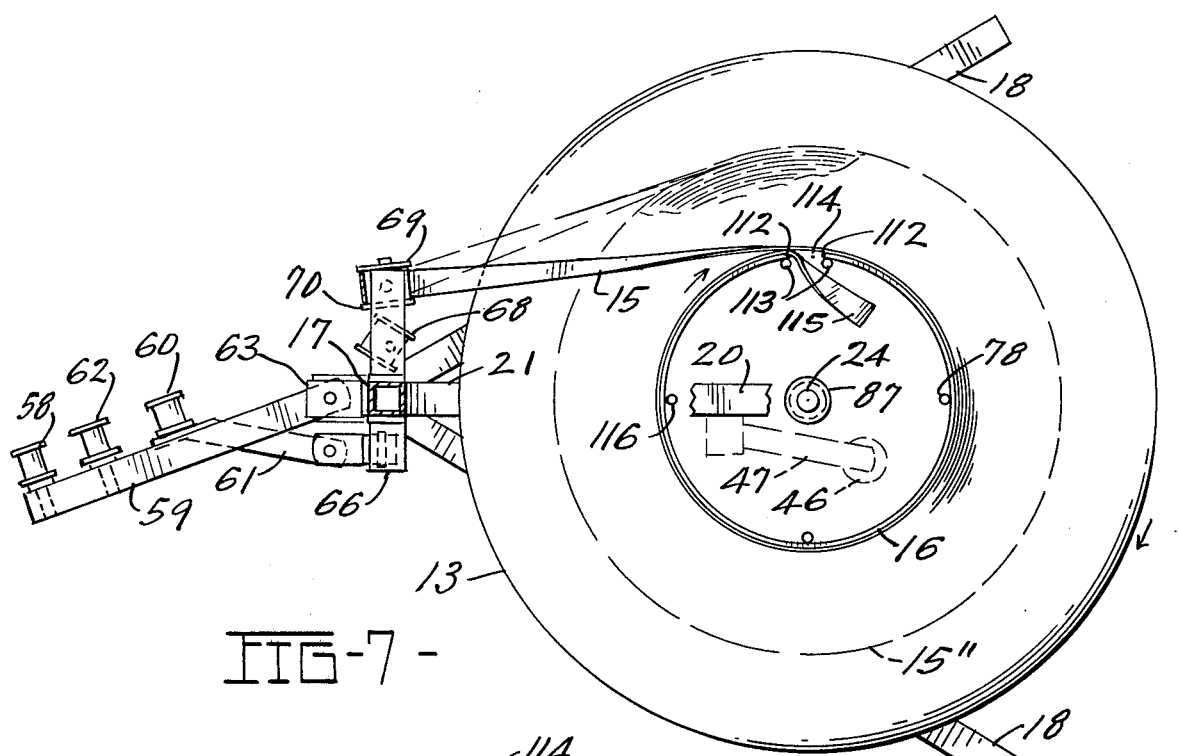
FIG-7-
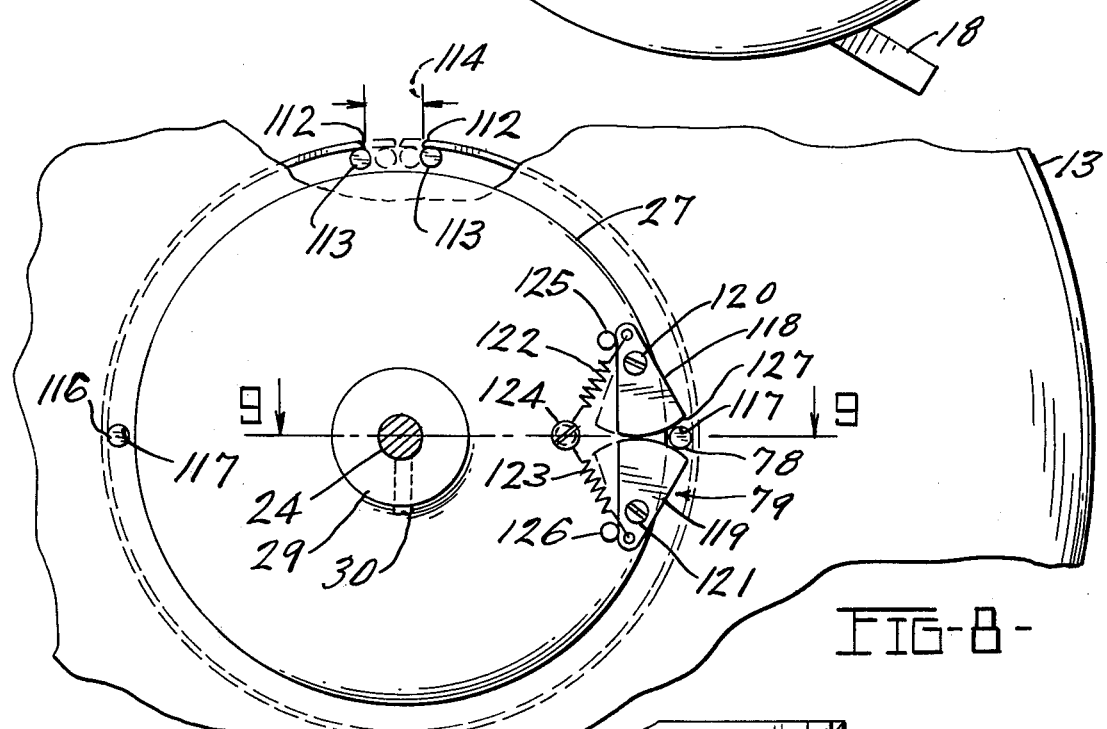
FIG-8-
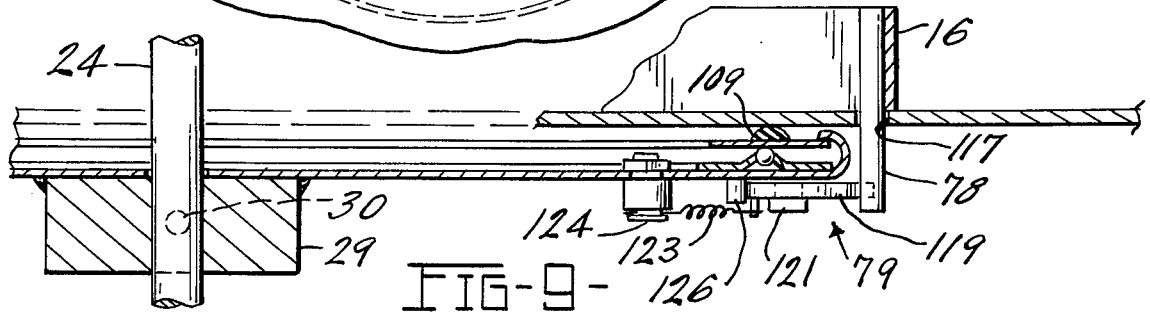
FIG-9-

FILM SUPPLY AND TAKE-UP SYSTEM FOR MOTION PICTURE PROJECTOR

BACKGROUND OF THE INVENTION

This invention relates to a motion picture film transport and more particularly to an improved film transport in which motion picture film is unwound from the center of a horizontal coil on a first platter and wound onto the exterior of a horizontal coil on a second platter.

Theater motion picture projectors are assembled from several different component parts. These parts include a projection head, a light source, a sound head and a film supply and take-up transport system. Film from a supply coil in the transport system is intermittently advanced past an aperture in the projection head, past the sound head and returned to a take-up coil in the transport system. Various types of film transports have been used in prior art motion picture theater projectors. The most common prior art film transport includes a film supply reel and a film take-up reel. The projection head pulls film from the supply reel at the rate required for normal projection, for example 90 feet per minute, and the take-up reel is driven to wind up the film after it leaves the projection head and the sound head. A system of this type has several disadvantages. The film wound onto the take-up reel is collected on the periphery of the reel so that at the end of the show, the film is in reverse order on the reel. Therefore, it is necessary for an operator to rewind the reel before the next showing. Because of the need for rewinding, two complete motion picture projection systems are needed for continuous operation of a theater. Films are normally shown in segments which are on the order of 20 to 30 minutes in length. While one segment is being shown, the operator rewinds the previously shown segment and then threads the next segment into the projector. With a system of this type, longer film segments are generally not practical since each film reel must be manually loaded and unloaded from the projector and commercial film has considerable weight. As a consequence, a projection room operator must normally be present during operation of a theater.

An improved prior art film transport system is shown in, for example, U.S. Pat. No. 3,661,337 which issued on May 9, 1972 and in U.S. Pat. No. 3,780,959 which issued on Dec. 25, 1973. These patents show a transport system including at least two horizontal platters. The film supply rests in a horizontal coil on a first one of the platters. As a motor rotates the platter, the film is unwound from the center of the coil and delivered to the projection head. The motor speed is varied to maintain a desired film supply rate. A second platter is provided with a core and is rotated by a second motor at a controlled speed for winding the film from the projection head about the core. The film is wound about the exterior of the core to form an increasing diameter coil. At the end of the show, the core is moved from the take-up platter to what was previously the supply platter or to another platter. The operating mode of the two platters then reverses. The second platter, which now carries the coil of film, becomes the supply platter and the film is removed from the center of the coil. A film transport system of this type has several advantages over a reel-type transport in that an entire film may be positioned on the transport system. This eliminates the need for changing reels during the show. Furthermore, since the film is removed from the center of the coil on the supply reel, the need for rewinding the film is eliminated. As a consequence, the projection room operator only need be present before the show for threading the film and starting the projector. However, prior art transport systems of the type using the horizontal platters have been complicated and expensive. The use of a separate motor for each platter and separate sensors for controlling the speed of each motor not only increases the expense, but also increases the chances of component failure.

SUMMARY OF THE INVENTION

According to the present invention, an improved platter-type film transport system is provided for supplying film to and collecting film from a motion picture projector. The transport includes a single unidirectional motor which drives a vertical shaft at a controlled rotational speed. Two or more bearing plates are attached to the shaft and a platter rests on each bearing plate. The platter is free to turn on the bearing plate independently of the shaft, although it will normally tend to rotate with the shaft due to frictional forces in the bearing plate. One of the platters functions as a film source or supply and carries a coil of the film. The film is removed from the center of the coil and delivered to the projector. As the film is removed from the center of the coil, the size of the innermost film loop is sensed for controlling a brake which slows the platter below the speed of the driven shaft. Film from the projector is collected on a second platter. A circular core is attached concentrically to the film take-up platter. When the core is attached to the platter, a locking mechanism connects the platter to the bearing plate so that the platter is rotated directly with the driven shaft. Film from the projector passes over a dancer arm which is positioned according to film tension and is wound on the core on the take-up platter. The position of the dancer arm adjusts a tap on an auto-transformer or adjusts a similar sensor which in turn controls the speed of the motor such that the take-up platter is rotated to wind up the film at the same average rate as the film is advanced through the projector.

Through the use of a single motor for driving a shaft which in turn drives each of two or more platters in a platter-type film transport, reliability is increased and cost is decreased over prior art platter-type transports which require separate motors and motor controls for each platter.

Accordingly, it is an object of the invention to provide an improved transport for delivering film to and collecting film from the projection head and sound head in a motion picture projector.

Another object of the invention is to provide an improved platter-type film transport for a motion picture projector.

Still another object of the invention is to provide an improved platter-type film transport for a motion picture projector in which a single motor is connected to drive a plurality of film carrying platters.

Other objects and advantages of the invention will become apparent from the following detailed description, with reference being made to the accompanying drawings.

BRIEF DESCRIPTION OF THE DRAWINGS

FIG. 1 is a perspective view of an improved platter-type film transport constructed in accordance with the present invention for use in a motion picture projection system;

FIG. 2 is a side elevational view of a platter-type film transport constructed in accordance with the present invention and showing film placement for a typical mode of operation;

FIG. 3 is a fragmentary cross-sectional view taken along line 3—3 of FIG. 2;

FIG. 4 is a fragmentary cross-sectional view taken along line 4—4 of FIG. 3;

FIG. 5 is a cross-sectional view taken along line 5—5 of FIG. 3;

FIG. 6 is a fragmentary cross-sectional view taken along line 6—6 of FIG. 4;

FIG. 7 is a cross-sectional view taken along line 7—7 of FIG. 2;

FIG. 8 is a fragmentary cross-sectional view taken along line 8—8 of FIG. 2; and FIG. 9 is a fragmentary cross-sectional view as taken along line 9—9 of FIG. 8.

DESCRIPTION OF THE PREFERRED EMBODIMENT

Turning now to the drawings and particularly to FIGS. 1 and 2, an improved film transport 10 is shown in detail for supplying film to and taking up film from a conventional motion picture projector (not shown) of the type used, for example, in movie theaters. The transport 10 includes a frame 11 which supports a plurality of driven discs or platters, of which three platters 12–14 are shown. In the exemplary embodiment shown in FIG. 2, the platter 12 functions as a film supply platter, the platter 13 functions as a film take-up platter and the platter 14 functions as a spare platter. However, the operating modes of the platters 12–14 are interchangeable and each platter may function in either a supply or a take-up mode.

Film 15 is initially positioned in a coil 15' on the supply platter 12. From the supply platter 12, the film is delivered to a projector including a projection head and a sound head. As the film is advanced through the projector, it is returned to the transport 10 wherein it is wound in a coil 15'' about a core 16 attached to the take-up platter 13, as shown in FIG. 2. After the entire film is wound upon the core 16 on the take-up platter 13, the core 16 is moved to either of the other platters 12 or 14, such as platter 12 as shown in FIG. 1. The platter 12 or 14 to which the core 16 is currently attached then becomes the film take-up platter and the platter 13 which at this time holds the film 15 becomes the supply platter. Thus, any one of the three platters 12–14 may at any time function as a film supply platter while any of the other two platters 12–14 may function as a film take-up platter. The spare platter 14, or other platter currently functioning as a spare platter, may be used for holding film for a second show or for making up a new show. Normally, a show is received from a supplier on a number of reels which typically hold 20 to 30-minute film segments. During makeup, these segments are spliced together on one of the platters, such as the spare platter 14.

The frame 11 includes a generally vertical column 17 supported by two angled legs 18. Four arms 19–22 project horizontally from one side of the column 17.

A motor 23 is mounted below and in vertical alignment with the arms 19–22. A vertical drive shaft 24 is connected to the motor 23 and extends upwardly through aligned bushings 25 in each of the arms 20–22. Three bearing plates 26–28 are positioned on the shaft 24 with one of the bearing plates 26–28 located above each of the arms 20–22, respectively. Each of the bearing plates 26–28 includes a collar 29 through which a set screw 30 is threaded for connecting the bearing plates 26–28 to the drive shaft 24. The platters 12–14 are concentric with the drive shaft 24 and rest upon the bearing plates 26–28, respectively. The bearing plates 26–28 connect the platters 12–14 to the drive shaft 24 such that the platters 12–14 will tend to rotate with the drive shaft 24. However, the application of a braking force to any of the platters 12–14 will slow such platter below the speed of the drive shaft 24, or, even completely stop the platter. A brake 31 is mounted on the arm 20 below the platter 12, a brake 32 is mounted on the arm 21 below the platter 13 and a brake 33 is mounted on the arm 22 below the platter 14. When any of the brakes 31–33 is actuated, a frictional braking force is applied to the adjacent platter 12–14 for slowing such platter below the rotational speed of the drive shaft 24.

A number of guide rollers or pulleys are provided adjacent to each of the platters 12–14 for guiding film to and from the platters 12–14. Since each of the platters 12–14 may function either in a film supply mode or in a film take-up mode, duplicate sets of pulleys must be provided for guiding film from and for supplying film to each platter.

As previously indicated, in the embodiment shown in FIG. 2, the platter 12 is functioning in a film supply mode. Initially, the entire film 15 rests in a coil 15' upon the platter 12. The film 15 is removed by unwinding from the center of the coil 15'. The loop at the center of the coil 15' passes around a pulley 38 mounted on an arm 39 and between two guide pulleys 40 and 41. The pulleys 38, 40 and 41 are free to rotate on vertical axis. From the pulleys 40 and 41, the film passes between a pair of horizontal pulleys 42 and 43 attached to the column 17 and over a pulley 44 attached at the top of the column 17. The film 15 twists 90° from a vertical plane to a horizontal plane as it moves from the pair of pulleys 40 and 41 to the pair of pulleys 42 and 43. From the pulley 44, the film passes to the projector (not shown), which, as previously indicated, may be of any conventional design. The pulley 44 is attached to the column 17 by a swivel mounting 45 which permits at least a limited degree of motion between the pulley 44 and the column 17 for alignment of the film with the projector. A similar set of pulleys is provided for the platter 13 when the platter 13 is used in a film supply mode. For the platter 13, the film 15 is unwound from the center of a coil and passes over a pulley 46 mounted on an arm 47, and between a pair of vertically oriented guide pulleys 48 and 49. From the pulleys 48 and 49, the film twists 90° and passes between a pair of horizontal pulleys 50 and 51 on the column 17 and upwardly over the pulley 44 and thence to the projector. Similarly, when the platter 14 functions in a film supply mode, film is unwound from the center of a coil resting on the platter 14 and passes over a pulley 52 mounted on an arm 53. From the pulley 52, the film passes between a pair of vertically mounted guide pulleys 54 and 55, twists 90° and passes between a pair of horizontally mounted pulleys 56 and 57 on the column 17. From the pulleys 56 and 57, the film passes upwardly and over the pulley 44 and thence to the projector.

The platter 13 is shown functioning in the film take-up mode in the embodiment of FIG. 2. From the projector, the film passes over a pulley 58 on an arm 59, over a pulley 60 on a dancer arm 61 and over a second pulley 62 on the arm 59. The arm 61 is attached to the column 17 by means of a vertical pivot pin 63 on a bracket 64. The pin 63 permits rotation of the arm 59 about a vertical axis for alignment of the pulley 58 with the projector. The arm 61 also includes a hinge 65 to permit alignment of the pulley 60 below the pulleys 58 and 62. The arm 61 is connected to the shaft of a signal generating device 66, such as a variable tap auto-transformer, a Variac, a variable resistor, etc. Gravity tends to pull the arm 61 down while the loop of the film 15 extending between the pulleys 58, 60 and 62 raises the arm 61. The vertical position of the arm 61, which is determined by the size of the film loop, determines the output signal from the device 66 for controlling the speed of the motor 23. From the pulley 62, the film 15 passes over an idler pulley 67 mounted adjacent the base of the column 17. From the idler pulley 67, the film 15 passes upwardly and over a pulley 68 attached to the column 17. The pulley 68 is attached to the column 17 by means of a bracket 70 which permits rotation of the pulley 68 about a horizontal axis and also about a vertical axis for alignment with the changing periphery of a coil 15" of the film 15 on the platter 13. From the pulley 68, the film twists 90° and is wound about the core 16 which is attached to the platter 13.

Similar pulleys are mounted on the column 17 adjacent the platters 12 and 14. When the core 16 is positioned on the platter 12 so that the platter 12 is operated in a film take-up mode, film passes from the idler pulley 67 over a pulley 71 and is wound onto the core 16 on the platter 12. Similarly, when the platter 14 functions in a film take-up mode, the film 15 passes from the idler pulley 67 over a pulley 73 and onto the platter 14. Thus, through selection of the pulleys guiding the film 15, each of the three platters 12–14 may be used either in a film supply mode or in a film take-up mode.

As indicated above, the speed of the motor 23 is determined by the position of the dancer arm 61 which controls the output from the device 66. The control signal from the device 66 passes into a control 75 which, in a conventional manner, controls the speed of the motor 23 in response to the signal from the device 66. The three bearing plates 26–28 are, therefore, rotated with the drive shaft 24 at a speed determined by the position of the dancer arm 61 or, in effect, the tension or length in the film 15 between the projector and the film transport 10 which in turn determines the size of the film loop between the pulleys 58, 60 and 62.

As will be discussed in greater detail below, when the core 16 is positioned on the platter 13, as shown in FIG. 2, or on one of the other platters, a pin 78 projects through a platter 13 and engages a lock 79 on the bearing plate 27. Similar locks 80 and 81 are mounted, respectively, on the bearing plates 26 and 28. The pin 78 and the lock 79 cooperate to prevent rotation between the platter 13 and the bearing plate 27. Therefore, the platter 13 is rotated directly with the drive shaft 24 for winding the film 15 in a coil 15" about the core 16 at a speed determined by the position of the dancer arm 61. As the diameter of the coil 15" increases, the rotational speed is decreased to maintain a constant film speed.

Since the film coil 15' on the supply platter 12 was originally wound upon the core 16 which is shown on the take-up platter 13, the internal diameter of the coil of film 15 on the supply platter 12 will initially be the same as the external diameter of the film coil on the take-up platter 13. When film is initially removed from the inside of the film supply coil 15' on the supply platter 12 for threading over the pulleys 40, 41, 42, 43, 44, through the projector and the return guide pulleys leading to the take-up platter 13, the diameter of the coil of film 15 on the supply platter 12 will be larger than the diameter of the coil of film on the take-up platter 13. Therefore, it is necessary to run the platter 12 at a slower speed than the platter 13. When the motor 23 is started, sufficient force is transmitted through the bearing plate 26 as to start rotating the platter 12. The platter 12 will eventually accelerate to the speed of the shaft 24, although initially there will be some slippage through the bearing plate 26.

As previously indicated, the film from the center of the coil of film 15 initially passes over the the pulley 38 on the arm 39. The arm 39 is mounted to pivot and is spring loaded to bias the pulley 38 against the film 15. If the size of the innermost film loop at the center of the coil 15' exceeds a predetermined dimension, the arm 39 is moved to actuate a switch which causes the brake 31 to be energized, thereby slowing down the platter 12. When the tension in the film 15 across the pulley 38 increases to move the arm 39 to a predetermined point, the switch is opened and the brake 31 is de-energized to release the braking action. The platter 12 will subsequently increase in speed towards the speed of the shaft 24 due to frictional coupling forces through the bearing plate 26. There will be some fluctuation or hunting in the speed of the film supply platter 12. However, this fluctuation is greatly damped due to the mass of the film coil 15' and the mass of the platter 12. Similarly, the position of the arm 47 controls energization and de-energization of the brake 32 for the platter 13 and the position of the arm 53 controls energization and de-energization of the brake 33 for the platter 14.

Turning now to FIGS. 3 and 4, enlarged fragmentary views are shown for the platter 12 and related structure for operating the platter 12 in the film supply mode. As best seen in FIG. 3, the arm 39 carrying the pulley 38 pivots from a housing 85 toward and away from the shaft 24. Normally, the film 15 is unwound from the center of the coil 15' and passes over the pulley 38 and between the pulleys 40 and 41 as shown in solid in FIG. 3. A spring mounted within the housing 85 tends to bias the arm 39 towards the position shown in dashed lines in FIG. 3. If the film unwinds from the center of the coil 15' at a rate faster than the average rate in which the film is advanced through the projector, the arm 39 will move to the position shown in dashed lines. When the arm 39 moves to this position, a switch is closed to energize the brake 31, thereby slowing down the platter 12. When the arm 39 is pulled by the film 15 back to the position shown in solid in FIG. 3, the switch is opened to de-energize the brake. Although there will be some fluctuation or hunting in the speed of the film supply platter 12, the average speed is maintained at the necessary level to supply film at the rate required by the projector. The fluctuations in speed are greatly damped by the mass of the platter 12 and the film coil 15'.

A pulley 86 is provided on the shaft 24. If the inner loops of film should become tight, the film 15 will pass over the pulley 86 rather than being bent around the shaft 24. Similar pulleys 87 and 88 are provided on the shaft 24 to rest upon the platters 13 and 14, see FIG. 2, for protecting the film when the platters 13 and 14 are operated in a film supply mode. Details of the pulleys 40 and 41 are shown in FIG. 5. The pulley 40 includes a generally cylindrical body 90 with upper and lower flanges 91 and 92, respectively. The pulley 41 merely consists of a generally cylindrical body 93 which fits between the flanges 91 and 92 and the pulley 40. The film 15 is passed between the pulleys 40 and 41 and is restricted from movement in a vertical direction by the flanges 91 and 92.

The brake 31 is shown in detail in FIGS. 4 and 6. The brake 31 includes a housing 99 which straddles the arm 20 and is fastened in place by means of screws or bolts 100. A plate 101 is attached to the housing 99 by means of a pivot pin 102. The plate 101 is attached for limited rotational motion about the pivot pin 102. A pad 103 of a suitable friction material is attached to the upper surface of the plate 101. The housing 99 is of such a size and shape that the pad 103 is generally parallel to and spaced just below the platter 12. When energized, a solenoid 104 moves a plunger 105 to pivot the plate 101 about the pivot pin 102. When the plate 101 is thus pivoted or rotated, the friction pad 103 is urged against the lower surface of the platter 12 to frictionally brake or slow the platter 12. Thus, whenever the arm 39 is moved by the film 15 to a position closing the switch within the housing 85, the friction pad 103 is raised to apply a braking force against the platter 12.

FIG. 4 also shows construction details for the bearing plate 26. As previously indicated, the bearing plate 26 includes a collar 29 which is attached to the shaft 24 by means of a set screw 30. The collar 29 is connected to a flat rigid plate 106 which supports the weight of the platter 12 and any film on the platter 12. An annular bearing race 107 is attached to the plate 106 concentric with the shaft 24. A flat annular plate 108 rests upon the bearing race 107 and is rotatable with respect to the plate 106. The platter 12 rests upon a rubber ring 109 attached to the plate 108 above the bearing race 107. The outer periphery 110 of the plate 106 is rolled over the outer edge 111 of the plate 108 for retaining the plates 108 and 106 together. Through the action of the bearing 107, the platter 12 may be rotated at a speed different from the speed of the plate 106 as it is rotated with the shaft 24 by the motor 23. However, sufficient forces are coupled through the bearing plate 26 as to tend to rotate the platter 12 with the drive shaft 24.

Turning now to FIGS. 7-9, details are shown for the platter 13 and related structure as the platter 13 is operated in a film take-up mode. The core 16 consists of a flat metal band formed into a ring or circle and having spaced ends 112. Short metal rods 113 are attached to the ends 112 to define a slot 114 for receiving an end 115 of the film 15. The core 16 also includes the pin 78 and a pin 116 which extend through two holes 117 through the platter 13. The holes 117 lie on opposite sides of the shaft 24 and are spaced apart by a distance slightly greater than the diameter of the bearing plate 27. The pins 78 and 116 center and firmly hold the core 16 on the platter 13. One of the pins, pin 78 shown, also functions to engage the lock 79 for connecting the platter 13 to the bearing plate 27.

As best seen in FIGS. 8 and 9, the lock 79 is mounted on the bottom of the bearing plate 27. The lock 79 includes a pair of blades 118 and 119. A shoulder screw 120 attaches the blade 118 to the bottom of the bearing plate 27 for limited rotational movement about the screw 120. Similarly, a screw 121 attaches the blade 119 to the bottom of the bearing plate 27 for limited rotational movement. Springs 122 and 123 are connected from a screw 124 to the blades 120 and 121, respectively, for urging the blades 118 and 119 against stops 125 and 126, respectively. When the core 16 is attached to the platter 13, the pins 78 and 116 pass through the holes 117 in the platter 13 and project below the bearing plate 27. Subsequent rotation between the platter 13 and the bearing plate 27 causes one of the pins 78 or 116 to deflect one of the blades 118 or 119 until such pin snaps into a notch 127 between the blades 118 and 119. The deflected blade 118 or 119 then snaps back to its original position to lock the platter 13 and the bearing plate 27 together. Subsequent removal of the core 16 from the platter 13 releases the lock to permit relative rotation between the platter 13 and the bearing plate 27. Similar locking arrangements are provided on the bearing plates 26 and 28 for cooperating with the core 16 when it is attached to either the platter 12 or the platter 14.

From the above description of a preferred embodiment of the invention, it will be seen that the transport 10 of the present invention functions to drive two or more platters from a single drive shaft 24 rotated by a single motor 23. When a core 16 is attached to one of the platters, such platter functions in a film take-up mode for winding the film about the core at the same rotational speed at which the motor 23 rotates the drive shaft 24. The motor speed is controlled such that the film is wound upon the core 16 at the same rate in which it is advanced through the projector. Film is supplied to the projector from another of the platters which carriers the film wound in a coil concentric with the axis of the drive shaft 24. As the film is unwound from the center of the coil, coupling forces through a bearing plate on which the platter rests tend to drive the platter at the same speed as the drive shaft 24 while braking forces are selectively applied to maintain the average unwinding speed the same as the speed at which the film is advanced through the projector. Thus, a low-cost, simplified platter-type transport is provided for supplying film to and for taking up film from a motion picture projector of the type used in commercial movie theaters.

It will be appreciated that various modifications and changes may be made to the above-described film transport without departing from the spirit and the scope of the claimed invention.

What we claim is:

1. In a motion picture projection system, an improved film transport for supplying film to a projector through which the film is advanced and for taking up film from the projector comprising, in combination, a drive shaft, motor means for rotating said drive shaft at a controlled speed, at least two platter means for carrying coils of film, means for rotationally driving each of said platter means simultaneously from said drive shaft, one of said platter means functioning as a film take-up platter means for winding a coil of film from the projector and the other of said platter means functioning as film supply platter means for supplying film to the projector, means for controlling the rotational speed of said drive shaft for driving said take-up platter means to wind film at the same average rate that such film is advanced through the projector, and means for decreasing the rotational speed of said film supplying platter means below the rotational speed of said film take-up platter means for supplying film from a film coil on said film supplying platter means at the same average rate that such film is advanced through the projector.

2. An improved film supply and take-up transport, as set forth in claim 1, and further including a film winding core, and means for selectively attaching said core to either of said platter means concentric with the axis of rotation of such platter means, said core and the attached one of said platter means functioning as said film take-up platter means.

3. An improved film supply and take-up transport, as set forth in claim 2, and further including means for supplying film to the projector from the center of a film coil on said film supply platter means.

4. An improved film supply and take-up transport, as set forth in claim 3, wherein said means for rotationally driving each of said platter means includes means for driving said film supply platter means from said drive shaft at a speed directly proportional to the rotational speed of said drive shaft.

5. An improved film supply and take-up transport, as set forth in claim 1, wherein said means for rotationally driving each of said platter means includes means for driving said film supply platter means from said drive shaft at a speed directly proportional to the rotational speed of said drive shaft.

6. In a motion picture projection system, an improved film transport for supplying film to a projector through which the film is advanced and for taking up film from the projector comprising, in combination, a drive shaft, motor means for rotating said drive shaft at a controlled speed, at least two platter means for carrying coils of film, means for rotationally driving each of said platter means simultaneously from said drive shaft, a film winding core, means for selectively attaching said core to either of said platter means concentric with the axis of rotation of such attached platter means, said core and attached platter means functioning as a film take-up platter means for winding coil of film from the projector about said core and the other of said platter means functioning as film supply platter means for supplying film from the center of a film coil to the projector, means for controlling the rotational speed of said drive shaft for driving said take-up platter means to wind film about said core at the same average rate that such film is advanced through the projector, and means for decreasing the rotational speed of said film supply platter means below the rotational speed of said take-up platter means for supplying film from the center of a film coil on said film supplying platter means at the same average rate that such film is advanced through the projector.

7. An improved film supply and take-up transport, as set forth in claim 6, wherein said means for decreasing the rotational speed of said film supply platter means comprises said means for rotationally driving said film supply platter means from said drive shaft, and brake means for decreasing the rotational speed of said film supply platter means below the controlled rotational speed of said drive shaft.

8. An improved film supply and take-up transport, as set forth in claim 6, wherein said drive shaft extends vertically, and wherein said means for rotationally driving said platter means comprises a plurality of bearing plates, one bearing plate for each of said at least two platter means, means attaching said bearing plates to said drive shaft in a vertically spaced relationship, and wherein each of said platter means is supported on a different bearing plate concentric with said drive shaft, said bearing plates including means for coupling said platter means to said drive shaft while permitting rotation between said platter means and said drive shaft.

9. An improved film supply and take-up transport, as set forth in claim 6, and further including means responsive to said core being attached to one of said platter means for locking such attached platter means to the bearing plate supporting such platter means whereby such platter means is prevented from rotating about said drive shaft.

10. In a motion picture projection system, an improved film transport for supplying film to a projector through which the film is advanced and for taking up film from the projector comprising, in combination, a vertical drive shaft, a motor connected to rotate said drive shaft at a predetermined controlled speed, at least two horizontal platters positioned coaxially on said drive shaft, at least two vertically spaced bearing means attached to said drive shaft for carrying said platters, said platters resting upon said bearing means for rotation with respect to said drive shaft, a film winding core, means for selectively attaching said core to either of said platters concentric with said drive shaft, means responsive to said core attaching means for locking the platter to which said core is attached to said drive shaft, said core and the attached platter functioning as a film take-up platter for winding a coil of film from the projector about said core and the other of said platters functioning as a film supply platter for supplying film from the center of a film coil to the projector, means for controlling the predetermined speed of said motor to wind the film about said core on said film take-up platter at the same average rate that the film is advanced through the projector, and brake means for controlling the average rotational speed of said film supply platter to supply film from the center of a film coil on such supply platter at the same average rate that the film is advanced through the projector.

11. An improved film supply and take-up transport, as set forth in claim 10, wherein said film supply platter is coupled through said bearing means to said drive shaft and wherein said brake means includes means for decreasing the rotational speed of said film supply platter below the rotational speed of said drive shaft whenever film is supplied from the center of a film coil on said film supply platter faster than the average rate that the film is advanced through the projector.

12. An improved film supply and take-up transport, as set forth in claim 11, wherein said brake means includes means for sensing when a loop of film at the center of a film coil on said film supply platter exceeds a predetermined size, and wherein said speed decreasing means in responsive to said sensing means.

13. An improved film supply and take-up transport, as set forth in claim 19, wherein said controlling means includes means for forming a variable sized loop in the film between the projector and said film take-up platter, the size of such film loop increasing when the film is wound on said film take-up platter at a slower rate than the film is advanced through the projector and decreasing when the film is wound on said film take-up platter at a faster rate than the film is advanced through the projector, means for sensing the size of such loop, and means for controlling the speed of said motor in response to said sensing means.

* * * * *

UNITED STATES PATENT OFFICE
CERTIFICATE OF CORRECTION

Patent No. 4,010,910  Dated March 8, 1977

Inventor(s) Angelo Boudouris, William D. Petty and Clarence S. Simonds

It is certified that error appears in the above-identified patent and that said Letters Patent are hereby corrected as shown below:

Column 10, line 58, "19" should be -- 10 --.

Signed and Sealed this

Tenth Day of May 1977

[SEAL]

Attest:

RUTH C. MASON
Attesting Officer

C. MARSHALL DANN
Commissioner of Patents and Trademarks